(12) United States Patent
Pinfold (10) Patent No.: US 11,472,548 B2
(45) Date of Patent: Oct. 18, 2022

(54) KITE ANCHOR QUICK RELEASE APPARATUS AND RELATED METHODS

(71) Applicant: NORTH KITEBOARDING AUSTRALASIA LIMITED, Auckland (NZ)

(72) Inventor: Hugh John Norman Pinfold, Raglan (NZ)

(73) Assignee: NORTH KITEBOARDING AUSTRALASIA LIMITED, Auckland (NZ)

( * ) Notice: Subject to any disclaimer, the term of this patent is extended or adjusted under 35 U.S.C. 154(b) by 163 days.

(21) Appl. No.: 16/694,563

(22) Filed: Nov. 25, 2019

(65) Prior Publication Data

US 2020/0164977 A1 May 28, 2020

Related U.S. Application Data

(60) Provisional application No. 62/772,032, filed on Nov. 27, 2018.

(51) Int. Cl.
*B64C 31/06* (2020.01)
(52) U.S. Cl.
CPC .................................. *B64C 31/06* (2013.01)

(58) Field of Classification Search
CPC .......... B64C 31/06; B63H 9/069; B63H 8/16; B63H 8/54; F16B 45/00; Y10T 24/45361; Y10T 24/45366
See application file for complete search history.

(56) References Cited

U.S. PATENT DOCUMENTS

| | | | |
|---|---|---|---|
| 2004/0004160 A1* | 1/2004 | Pouchkarev | B63H 8/16 244/146 |
| 2004/0140393 A1* | 7/2004 | Barrs | B63H 8/16 244/15 |
| 2004/0182968 A1* | 9/2004 | Gentry | B63H 8/16 244/155 A |
| 2008/0104809 A1* | 5/2008 | Lin | F16B 45/02 24/600.1 |
| 2015/0108279 A1* | 4/2015 | Enserink | B63H 9/069 244/155 A |
| 2020/0130788 A1* | 4/2020 | McLean | B63H 8/54 |

* cited by examiner

*Primary Examiner* — Medhat Badawi
*Assistant Examiner* — Vicente Rodriguez
(74) *Attorney, Agent, or Firm* — Michael Soderman (57) ABSTRACT

A traction kite anchor device has a base provided at an end of at least one kite line and a release member able to move relative the base by a hand of a user of the kite. A trip arm is pivotally connected to the base to move between a first rotational position relative the base and a second rotational position relative to the base. The trip arm carries a latch that can lock and release a catch of a chicken loop upon moving the release member relative the base.

21 Claims, 12 Drawing Sheets

*FIG. 11B*

KITE ANCHOR QUICK RELEASE APPARATUS AND RELATED METHODS

PRIORITY CLAIM

This application claims the right of priority to U.S. Provisional Application No. 62/772,032 filed on Nov. 27, 2018, the entirety of the contents of which are hereby incorporated by reference.

FIELD OF THE INVENTION

The present invention relates to apparatus and methods for use in wind-driven propulsion using a traction kite. More particularly but not solely, the present invention relates to a quick release apparatus of a chicken loop used to connect a user to a traction kite.

BACKGROUND TO THE INVENTION

Ancient and medieval sources describe kites being used for measuring distances, testing the wind, signaling, and communication for military operations. The advent of powered aircraft diminished some interest in kites, but kites have remained popular for recreational uses.

More recently, traction kites have become popular in personal transportation, sporting, and leisure activities. These kites may for example be in the form of foils utilizing leading edge inflatable tubes. These kites are commonly used in kite surfing where a user stands on and is transported over water by a board such as a dedicated kite board or a surfboard.

When using a traction kite in an activity such as kite surfing, the user is commonly connected to load bearing kite lines, that extend from the leading edge of the kite, by a harness worn by the user. Such lines are normally the primary load bearing lines. The user can selectively control the angle of attack of the kite to power and depower the kite and to control the kite's position in the sky above the user by sheeting in or out control lines associated with the trailing edge of the kite.

A user commonly wears a harness that is releasably connected to the load bearing lines of the kite by a loop, often called a chicken loop, that hooks onto a hook of the harness. The load bearing lines directly or indirectly terminate at a common anchor and also from which the chicken loop extends. Under normal use conditions the connection of the chicken loop to the harness remains. It is not released. The loop is normally released once the kite has landed or is depowered, by the user manually unhooking the loop from the hook. Such manual unhooking is possible when the kite is sufficiently depowered.

While kite boarding may present as an exhilarating leisure or sporting activity, the fact that the user is connected to the kite can present serious dangers to the user especially when the kite is powered up. To at least partially de-power the kite, the user may sheet-out or release the rear control lines. This may decrease or neutralize the angle of attack of the kite.

However, in certain situations this gradual de-powering of the kite may not avoid danger. This may occur for example due to a loss of control either of the kite or board by the user, adverse weather conditions such as large gusts of wind, or equipment failure. Continued connection to a powered up kite in these circumstances can present the potential for significant physical harm to the user, or to other marine users. In these conditions the user may need to significantly de-power or entirely disconnect themselves from the kite Hence in addition to allowing for manual unhooking to disconnect the primary load lines from the harness, for the safety of the user it is common to provide a quick release mechanism to let the kite be safely released from the user if they are in danger or they or the kite are out of control. Such mechanisms need to work whilst the kite is powered up because this is when an out of control kite can cause danger to the user and others around.

This may be done by disconnecting either or both sides of the chicken loop from the anchor. This allows the chicken loop to slip out of the harness hook and become detached from the user's harness, to substantially depower the kite and drop it from the sky rapidly and free the user from overpowering forces of the kite.

Once the user has regained control of the situation, they may wish to re-loft the kite and continue kiting. To do this, the chicken loop must be re-secured to the anchor into a loop formation and the loop can then be reattached to the user's harness. Common quick release mechanisms have a release member that can be moved to release the power from the kite. But this release member must also be maneuvered to re-secure the chicken loop. This operation is commonly carried out by a user in the water. Time may be of the essence, and the user may have to contend with wind and waves during the reconnection. Particularly where the water is cold, the user's dexterity in performing this operation may be limited. A user may be wearing gloves and this may hamper the user's ability to reset the chicken loop.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

For the purpose of this specification, where method steps are described in sequence, the sequence does not necessarily mean that the steps are to be chronologically ordered in that sequence, unless there is no other logical manner of interpreting the sequence.

It is an object of the present invention to provide a kite anchor quick release apparatus and related methods which overcome or at least partially ameliorates some of the abovementioned disadvantages or which at least provides the public with a useful choice.

Alternatively or additionally, it is an object of the present invention to provide a traction kite anchor device for attachment to a harness worn by a user to transfer force from a traction kite to the user, where the anchor is able to be selectively released from the user's harness.

Alternatively or additionally, it is an object of the present invention to provide a quick release mechanism for an end of a chicken loop of a traction kite anchor apparatus.

Alternatively or additionally, it is an object of the present invention to provide a method of loading a catch of a chicken loop into a kite anchor device.

Alternatively or additionally, it is an object of the present invention to provide a method of releasing a catch of a chicken loop from a kite anchor device.

Alternatively or additionally, it is an object of the present invention to provide a kit of parts for use as a kite anchor device.

SUMMARY OF THE INVENTION

In a first aspect, the present invention broadly consists in a traction kite anchor device to transfer force from a traction kite to a user by attachment of the kite via yet quick release from a chicken loop to a harness worn by the user, the traction kite anchor device comprising;

a base provided at an end of at least one line connected directly or indirectly to, or for connection with, a said kite, a release member able to move relative the base between a first position being a retaining position and a second position being a release position, by a hand of a user of the kite, a trip arm pivotally connected to the base to move between a first rotational position relative the base and a second rotational position relative to the base, the trip arm having a first end at one side of said pivotal connection thereat to be retained in its first position by and when the release member is in its retaining position and wherein the trip arm is able to move from its first position to its second position when the release member is in its release position, a latch mounted at another location to said first end by said trip arm to move between a latching condition and an unlatching condition with trip arm when the trip arm moves between its first and second positions, a catch of a chicken loop able to be maneuvered relative to the latch to become latched with the latch and be retained by the latch to the base when the trip arm is in the first position and the release member is in its retaining position and the catch is able to be unlatched from the latch and the base member when the latch moves with the trip arm to the trip arm's second position when the release member is caused to move by the user to its release position.

Preferably the trip arm is confined for movement from its first position when the release member is in its retaining position by the base member and the release member.

Preferably the latch in its latching condition can secure with the catch and prevent the catch from releasing from the latch until the release member is moved to its release position to allow the trip arm to move to its second position to move the latch its unlatching condition to unlatch the catch from the latch and wherein the latch is able to, independent of the position of the release member, be moved relative to the catch during catch latching to allow the passage of the catch to latched condition.

Preferably the base has a centerline that is parallel the direction of force applied by the kite line(s) connected to the base.

Preferably the base has a centerline that is parallel and coaxial the direction of force applied by the kite line(s) connected to the base.

Preferably the trip arm is retained in its first position by contact with the release member at a first end of said trip arm.

Preferably in its release position the first position of the first end is closer to the centerline than the second position of the first end.

Preferably the trip arm is retained in its first position by contact with the release member and base at a first end of said trip arm.

Preferably the trip arm is confined for movement from the first position by the release member, when the release member is in the retaining position.

Preferably the trip arm can pivot the latch about the pivotal connection from the latching condition to an unlatching condition of the latch when the trip arm moves from its first position to its second position.

Preferably the trip arm is pivotably associated with the base the base having a centerline that is parallel the direction of force applied by the kite lines connected to the base and wherein the first end of the trip arm is positioned more proximal the centerline in its first position and is more distal the centerline when in its second position.

Preferably the trip arm only moves pivotably between its first and second positions.

Preferably the movement of the latch from the latching condition as a result of the movement of the trip arm from its first position to its second position comprises either or both of a) a translation of the latch relative the trip arm and b) a pivoting of the latch relative the trip arm as the trip arm pivots relative to the base.

Preferably the base and the latch cooperate, when the latch is in its latching condition and the trip arm is in its first position, to ensure the catch remains in its latched condition.

Preferably the latch is able to move relative the trip arm between a loading condition and its latching condition when the trip arm is in its first position.

Preferably the latch is able to slide relative the trip arm between a loading condition and its latching condition when the trip arm is in its first position. Preferably the latch is able to rotate relative the trip arm between a loading condition and its latching condition when the trip arm is in its first position.

Preferably in the loading condition the catch is able to move to a position relative to the latch to subsequently become latched therewith.

Preferably the movement of the latch from the latching condition as a result of the movement of the trip arm from its first position to its second d position comprises either or both of a) a translation of the latch relative the trip arm and b) a pivoting of the latch relative the trip arm as the trip arm rotates relative to the base.

Preferably the trip arm is biased away from its first position and towards its second position.

Preferably movement of the release member to its release position allows the trip arm to move, under the influence of the bias, from the first position to the second position.

Preferably the trip arm is associated with the release member, such that a movement of the release member from the retaining position to the release position causes a movement of the trip arm from its first position to its second position.

Preferably the trip arm is associated with the release member, such that a movement of the release member from the release position to the retaining position causes a movement of the trip arm from its second position to its first position.

Preferably the trip arm is biased towards its first position and away from its second position.

Preferably the movement of the release member from the retaining position to the release position allows the movement of the trip arm, against the bias, to its second position by force applied by the chicken loop to the latch, when the catch is in the latched condition.

Preferably at or after reaching the second position and release of the catch from the latch, trip arm can return under the bias to the first position.

Preferably in a return of the release member from its release position to its retaining position the trip arm is caused by the release member to return to its first position, and the latch carried by the trip arm is returned to its latching condition.

Preferably the release member is biased for movement towards its retaining position.

Preferably the release member is grippable by the hand of a user, in use.

Preferably the release position of the release member is, in use, away from a said user relative to the retaining position of the release member.

Preferably the latch is pivotably carried by the trip arm, such that it is able to pivot relative the trip arm in a first direction from the latching condition to a loading condition at which the catch may pass by the latch sufficient to become latched with the latch, when the trip arm is in its first position.

Preferably the latch is pivotably carried by the trip arm.

Preferably the latch is pivotably carried by the trip arm, such that it is able to pivot relative the trip arm in a first direction from the latching condition to a loading condition at which the catch may pass by the latch back and in a second direction from the loading condition to the latching condition for the latch to hold the loaded catch in the latched condition.

Preferably the latch is translatably carried by the trip arm, such that it is able to translate relative the trip arm.

Preferably the latch is translatably carried by the trip arm, such that it is able to translate relative the trip arm and not rotate relative the trip arm.

Preferably the latch is pivotably and/or translatably carried by the trip arm, such that it is able to pivot and/or translate relative the trip arm.

Preferably the latch is biased towards its latching condition.

Preferably a bias of the latch is provided acting between the latch and the trip arm.

Preferably a bias of the latch is provided between the latch and the base.

Preferably the latch is biased towards its latching condition independent of the position of the trip arm.

Preferably the passage of a catch past the latch is against the bias of the latch towards its latching condition.

Preferably the latch is prevented from pivoting on the trip arm from the latching condition in a direction opposite the loading condition.

Preferably the prevention is by a material interference with the trip arm.

Preferably the prevention is by a material interference with the base.

Preferably when the latch is moved from the latching condition to unlatch a said catch of a said chicken loop from the base it moves to an unlatching condition.

Preferably during the passage of the catch past the latch when in the loading condition so that the catch may be to be latched, the release member remains in its retaining position and the trip arm remains in its first position.

Preferably the passage of the catch past the latch, so that the catch may be latched, is only provided for when the release member is in its retaining position.

In a second aspect the present invention may broadly be said to be a quick release mechanism for an end of a chicken loop of a traction kite anchor apparatus, the quick release mechanism comprising:

a base for connection to an end of at least one line connected to a said kite, a release member able to move relative the base between a retaining position and release position, a latch to releasable retain and allow repeated reloading of a catch of a said end of a said chicken loop to said base, and a trip arm rotationally supported by the base and carrying the latch, wherein the trip arm is a) confined from rotation from a first position of the trip arm relative the base when the release member is in its retaining position, to present the latch in a latching condition, and b) able to be rotated from its first position to a second position when the release member is in its released position to move the latch from the latching condition to unlatch a said catch of a said chicken loop from the base, and wherein the latch is able to, independent of the position of the release member, move on the trip arm from its latching condition to a loading condition to allow the passage of the catch past the latch for reloading of the catch with the latch.

Preferably the trip arm is confined for movement from the first position by the release member, when the release member is in the retaining position.

Preferably the trip arm pivots the latch from the latching condition to an unlatching condition due to a rotation of the trip arm from the first position to the second position.

In a further aspect the present invention may broadly be said to be a method of releasing a catch of an end of a chicken loop from a kite anchor device, the method comprising the steps of:

operating a release member of the kite anchor device from a first position to a second position relative to a base of the kite anchor device to cause or allow a trip arm carrying a latch holding the catch in association with the anchor device to move from a first position to a second position and consequently carry the latch from a latching condition with the catch to an unlatching condition at which the latch is disengaged from the catch and the catch is free to be removed engagement with the base and releasing the release member, wherein upon its release by the user, the release member returns under bias from its release position to its retaining position, and returns the trip arm from its second position to its first position, such that the latch carried by the trip arm is also returned to its latching condition for subsequent reloading of the catch.

In a further aspect the present invention may be a method as herein described using the anchor device as herein described.

Preferably following the release of a catch the catch may be re-loaded to the to the latch while the release member remains in its retaining position.

Preferably following the release of a catch the catch may be re-loaded to the anchor device while the release member remains in its retaining position, and the trip arm remains by the release member in its first position.

In a further aspect the present invention may be a method of re-loading a catch of a distal end of a chicken loop into a kite anchor device to present a loop of the chicken loop for attachment to a harness worn by a user to transfer force from a traction kite to the user, the method comprising the steps of moving the end of the catch against and past a latch of the anchor device and against a bias of the latch, and allowing the latch to return, under the bias, to a latching condition at which the catch is latched to the latch wherein during the step of moving the latch the release member of the anchor device is its retaining position relative to the base.

In yet a further aspect the present invention may broadly be said to be a traction kite anchor to hold and quick-release and reload a chicken loop therewith the anchor comprising:

a base a trip arm pivotally mounted to the base to pivot between a first rotational position relative the base and a second rotational position relative the base a latch mounted for movement (preferably rotational and/or translational) by and relative to the trip arm between a latching condition and a reloading condition wherein in a latching condition, when the trip arm is in its first position, a catch of the end of a chicken loop is able to be held in a latched condition by said latch with said base and wherein in a reloading condition, the catch is able to be moved relative the catch to become reloaded to its latched condition and wherein when the trip arm is moved to its second position the latch is moved to its unlatching condition causing the release of the catch from the latch and base.

As used herein the term "and/or" means "and" or "or", or both.

As used herein "(s)" following a noun means the plural and/or singular forms of the noun.

The term "comprising" as used in this specification [and claims] means "consisting at least in part of". When interpreting each statement in this specification [and claims] that includes the term "comprising", features other than that or those prefaced by the term may also be present. Related terms such as "comprise" and "comprises" are to be interpreted in the same manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

Other aspects of the invention may become apparent from the following description which is given by way of example only and with reference to the accompanying drawings.

BRIEF DESCRIPTION OF THE DRAWINGS

Preferred embodiments of the invention will be described by way of example only and with reference to the drawings, in which:

FIG. 9A-11B show another variation of the quick release mechanism.

DETAILED DESCRIPTION OF PREFERRED EMBODIMENTS

Figure 1A:
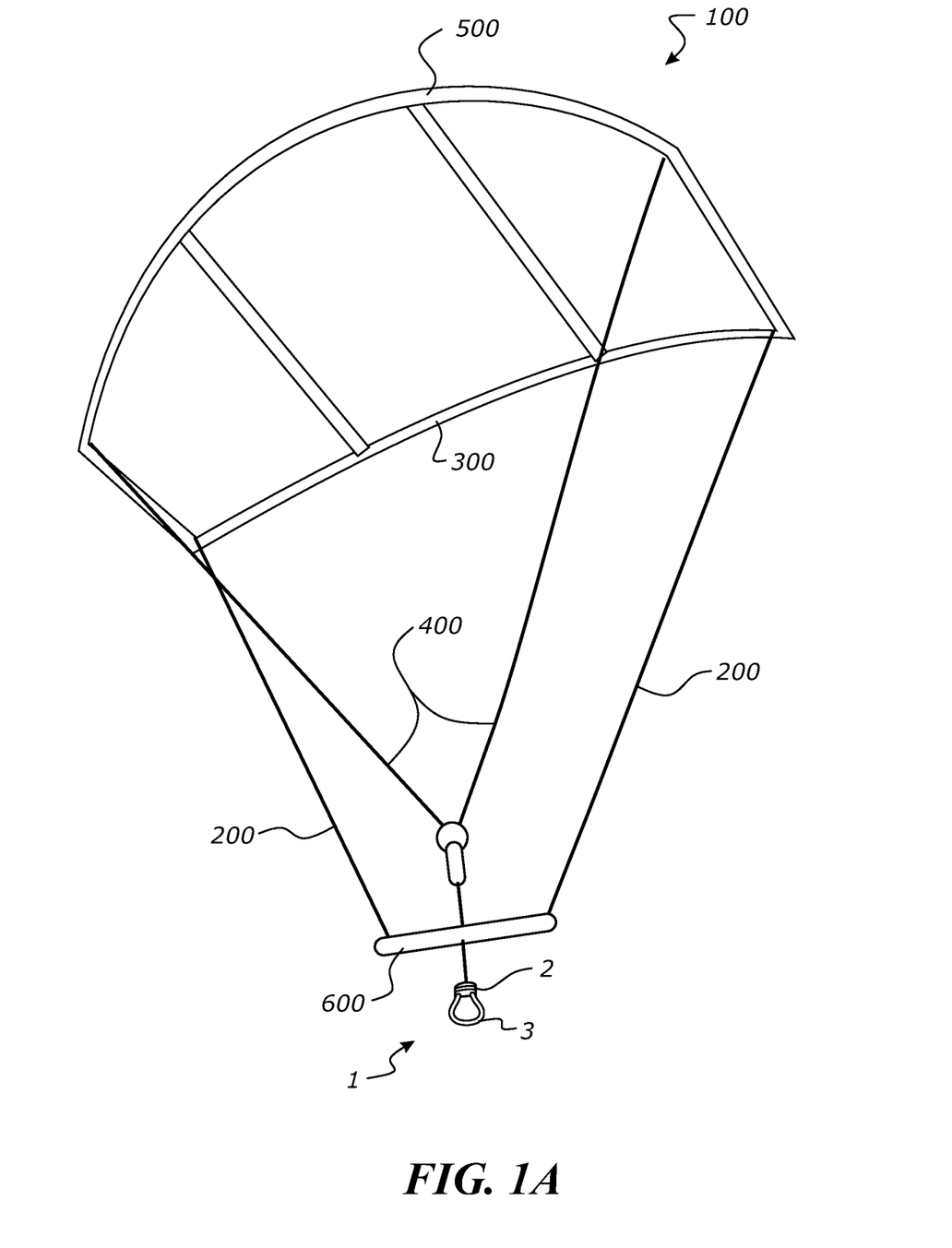
FIG. 1A shows a traction kite with power lines and control lines, a control bar and anchoring device and loop.

The present invention relates to kites, a typical set-up of a kite 100 being shown in FIG. 1A. The kite 100 is able to be controlled for motion in the air by control lines. Rear control lines 200 extend from or near the trailing edge 300 of the kite 100 and to a control bar 600. Front lines 400 extend from the leading edge 500 of the kite 100 directly or indirectly to an anchoring device 1.

Figure 1B:
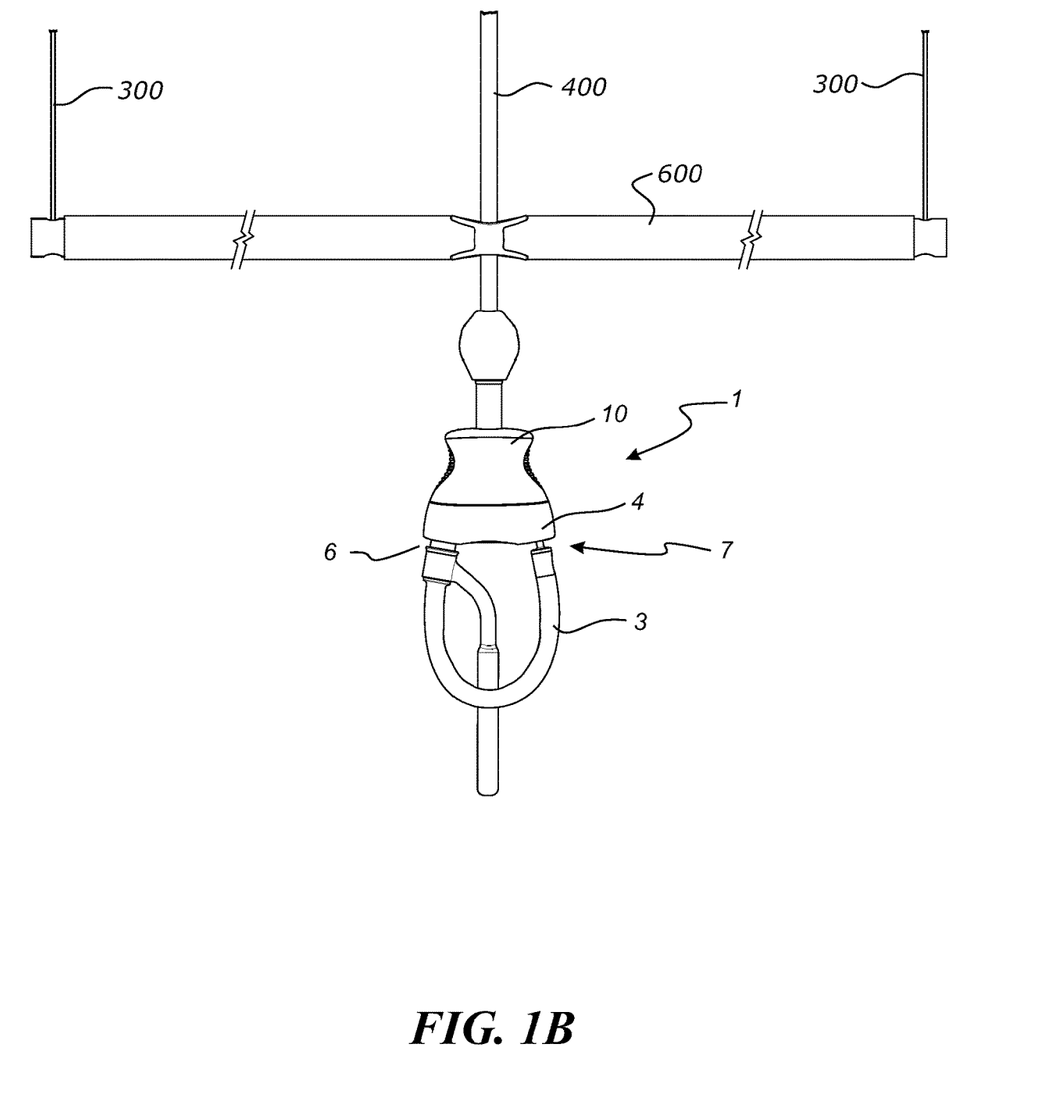
FIG. 1B shows a view of a kite anchor device and kite control bar.

A view of an anchoring device 1 according to an embodiment of the invention is shown in FIG. 1B. The anchoring device 1 is for attachment to a harness worn by a user, to transfer force from a traction kite to the user via a chicken loop 3. The harness may present a hook for releasable connection to the chicken loop. A chicken loop 3 is secured to a base 4 of the anchoring device 1 at a first end 6 and is releasably and reloadably connected at the second end 7, to the base 4. When the first and second ends of the chicken loop are attached to the base, the chicken loop is in a loop formation able to be connected to a harness of the user. When the second end is released from the base, the chicken loop is able to slide out of engagement with the harness thereby disconnecting the anchor member from the harness. The mechanisms by which the quick release and reloading of the chicken loop may occur will now be described.

Figure 2A:
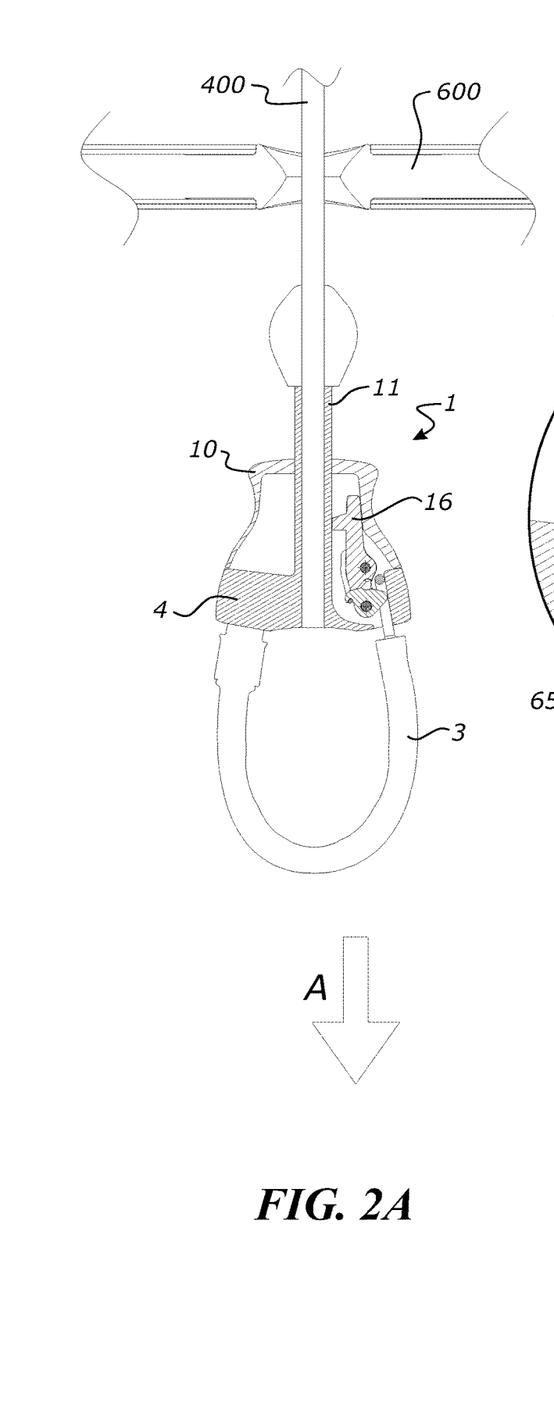
FIG. 2A shows a view of a catch of a chicken loop latched to a base of an anchor device.
Figure 2B:
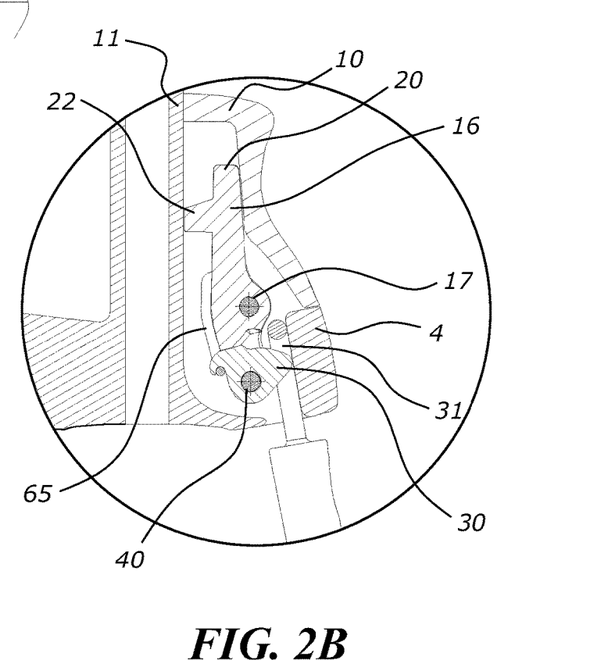
FIG. 2B shows a partial close-up view of the mechanism of FIG. 2A.
Figure 3A:
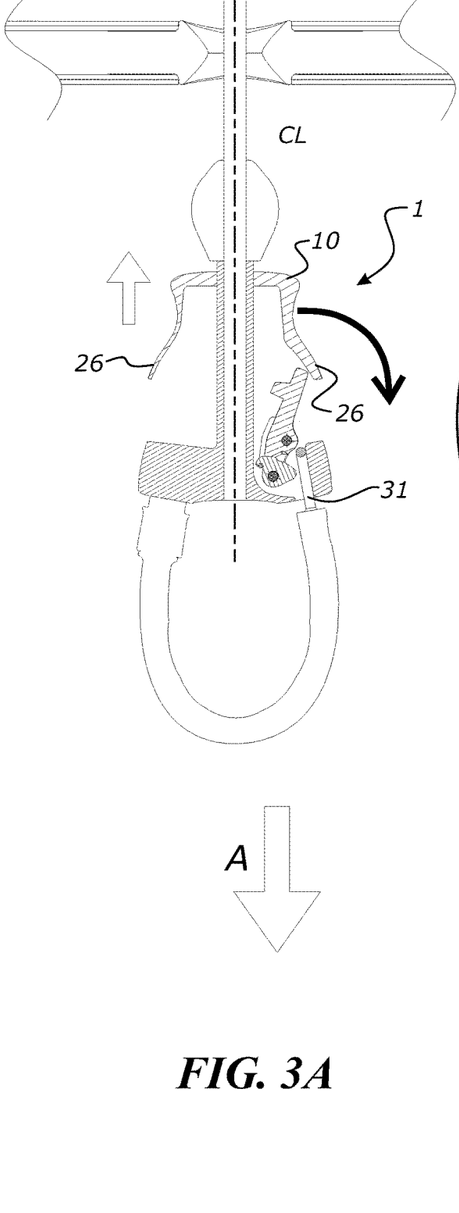
FIG. 3A shows a view of a release member associated with the base of an anchor device in a second position, and a catch of a chicken loop which is unlatched from the base.
Figure 3B:
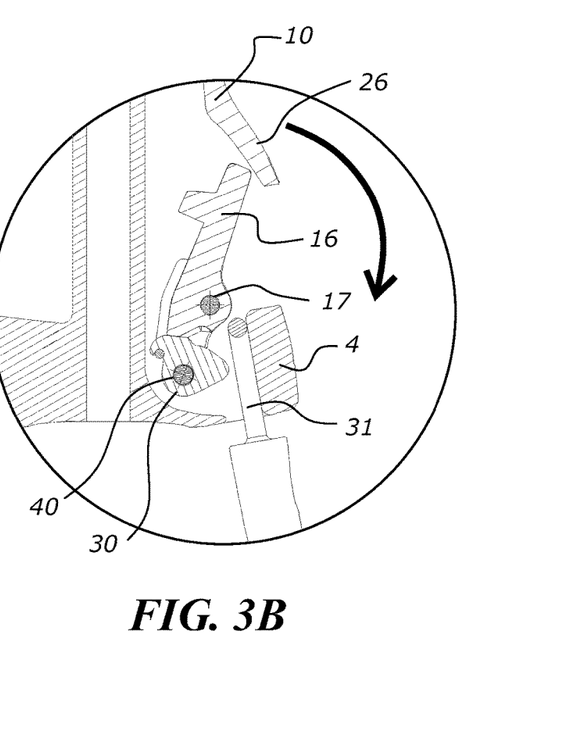
FIG. 3B shows a partial close-up view of the mechanism of FIG. 3A.

In FIG. 2A there is shown a partial cross section of the anchor device 1 of the present invention wherein a base 4 and a release member 10 is shown. The release member 10 is able to slide along for example a shank 11 of the base 4 between a retaining position as shown in FIG. 2A and a release position as shown in FIG. 3A. In the preferred form the release member moves in a linear manner relative to the base 4 between its retaining position as shown in FIG. 2A and its release position as seen in FIG. 3A. The release member 10 is able to be grasped by a user to move it from its retaining position as shown in FIG. 2A to its released position as shown in FIG. 3A. A person is able to grab the release member 10 between their thumb and fore finger for example and push the release member (away from themselves in normal kiting conditions). Mounted to the base 4 is a trip 16 arm. The trip arm 16 is pivotally mounted about a pivot axis 17 relative to the base 4. The trip arm can move between its first position as shown in FIGS. 2A and 2B and a second position as shown in FIGS. 3A and 3B. Moving between the first and second position is in a rotational manner relative to the base 4 about the pivot axis 17. When the release member 10 is in its retaining position as shown in FIGS. 2A and 2B, the trip arm 16 is retained in its first position. This is preferably achieved by contact of the distal end region 20 of the trip arm 16 with a part of the release member 10. A distal region 20 of the trip arm 16 may also be in contact with the base such as by way of the tab 22 contacting the shank 11 of the base 4. The distal end region 20 of the trip arm is hence captured between the base 4 and the release member 10 in its first position when the release member is in its retaining position as shown in FIGS. 2A and 2B. The trip arm 16 and the release member 10 are shaped and configured so that when the release arm is in its released position as shown in FIGS. 3A and 3B the trip arm is able to rotate about the pivot axis 17 to its second position as shown in FIGS. 3A and 3B. A flared region 26 of the release member may provide for this. In returning the release member from its released position as shown in FIGS. 3A and 3B back to the retaining position, the flared region 26 helps cause the movement of the trip arm 16 back to its first position. When the release member 10 has been moved from its released position to its retaining position the trip arm has been caused by the release member 10 and its movement, to move back from its second position to its first position. At another region of the trip arm 16, preferably opposite to the distal end region 20, there is mounted a latch 30. The trip arm acts as a lever arm about the pivot between the latch and the distal end region.

The latch 30 is able to move with the trip arm 16 in a rotational manner about the rotation axis 17 when the trip arm moves between its first and second positions. When the trip arm is in its second position as shown in FIG. 3B the latch 30 has rotated in a clockwise manner about the pivot axis 17. The latch 30 is able to secure a catch 31 of the end of the chicken loop with the base 4. The latch when the trip arm is in its first position is able to hold the catch 31 and prevent the catch from moving in the direction of the arrow A as seen in FIG. 2A. The chicken loop is in this instance in its use condition rather than its released condition. A user is able to secure a harness such as by way of a harness hook to the chicken loop 3 and both ends of the chicken loop are secured to the anchor device 1. When the latch is moved to its unlatching condition shown in FIG. 30 the catch 31 is free to move in the direction of the arrow A as seen in FIGS. 3A and 3B. The latch is no longer in its latching condition of FIGS. 2A and 2B and as seen in FIGS. 3A and 3B the catch is now free to be removed from the base 4. Such removal is shown with reference to FIGS. 4A and 4B and 5A and 5B.

With the catch removed from the anchor device the chicken loop is no longer in a looped configuration and is therefore released especially under the in the influence of high force often encountered on kite lines, from the harness.

Figure 5A:
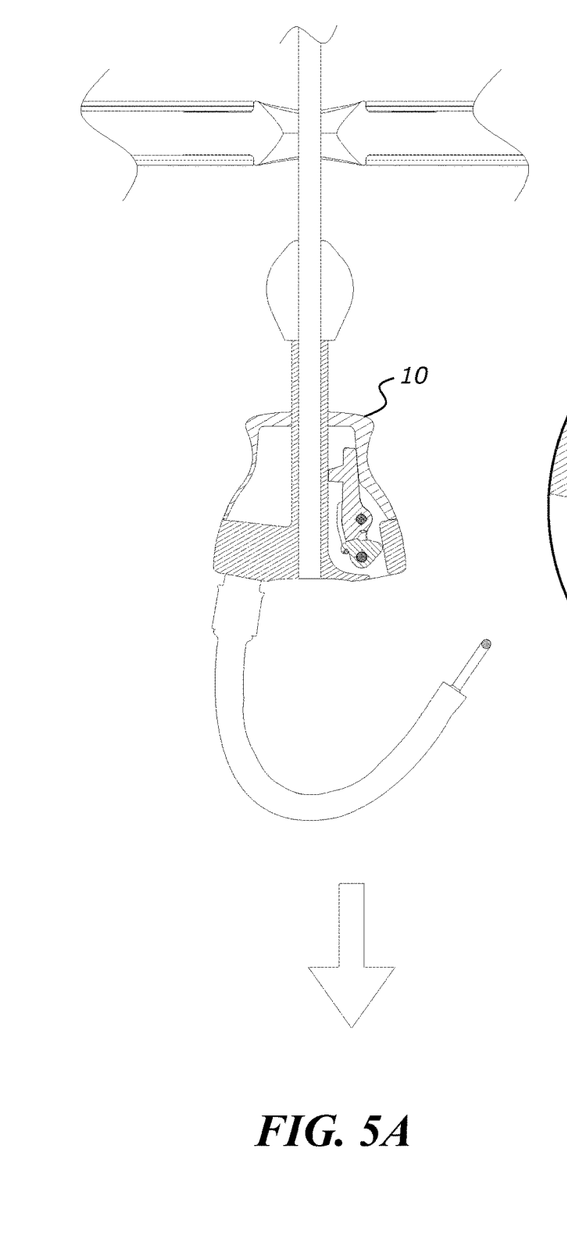
FIG. 5A shows a view of a base of an anchor device with an associated release member in a first position, and the catch of a chicken loop is free of the base.
Figure 5B:
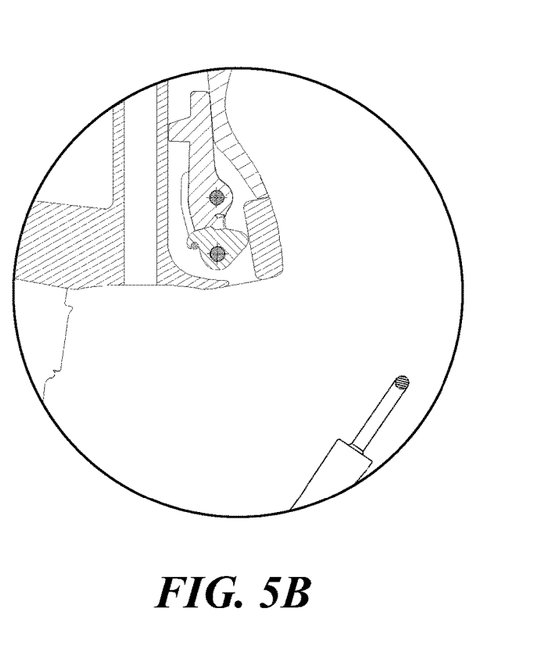
FIG. 5B shows a partial close-up view of the mechanism of FIG. 5A.

The release member 10 is able to reset to its retaining position and this may be under the influence of a bias such as a spring to help cause the movement of the release member back to its retaining position and to cause the trip arm to move back to its first position as shown in FIGS. 5A and 5B.

Figure 6A:
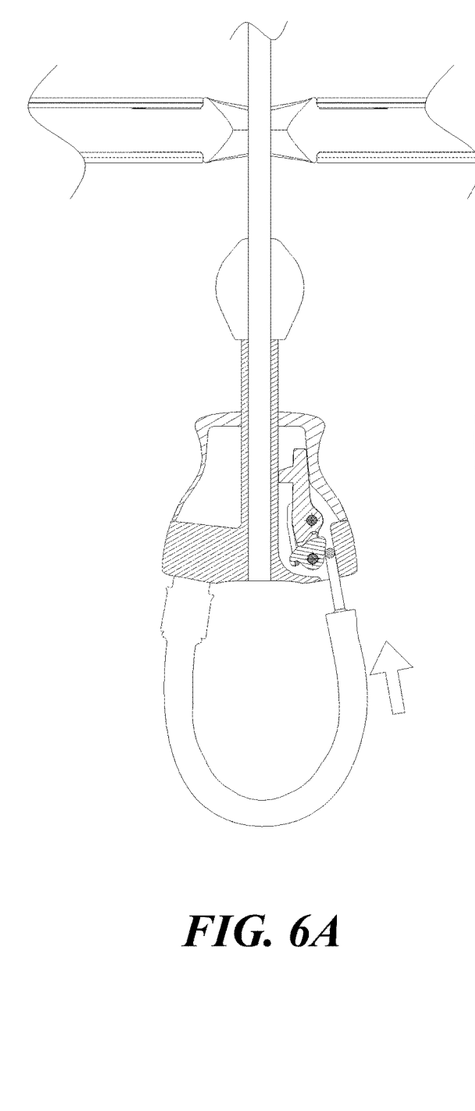
FIG. 6A shows a view of a catch of a chicken loop being inserted past a latch, and where the release member is in its first position.
Figure 6B:
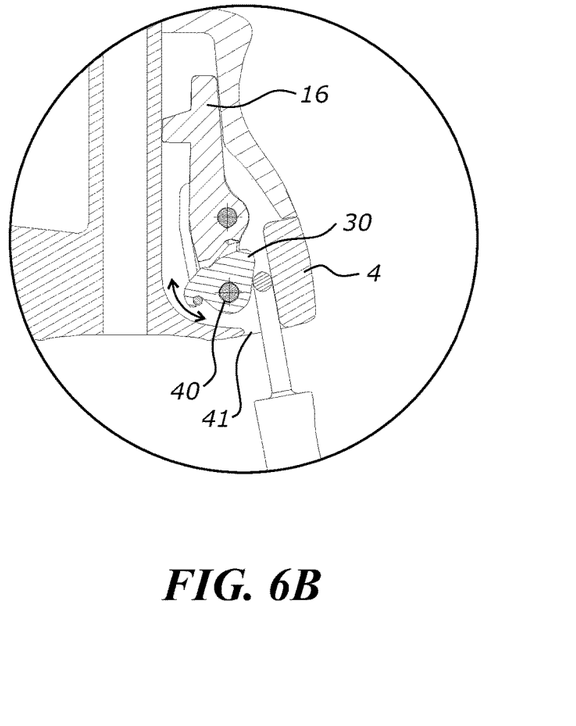
FIG. 6B shows a partial close-up view of the mechanism of FIG. 6A.
Figure 7A:
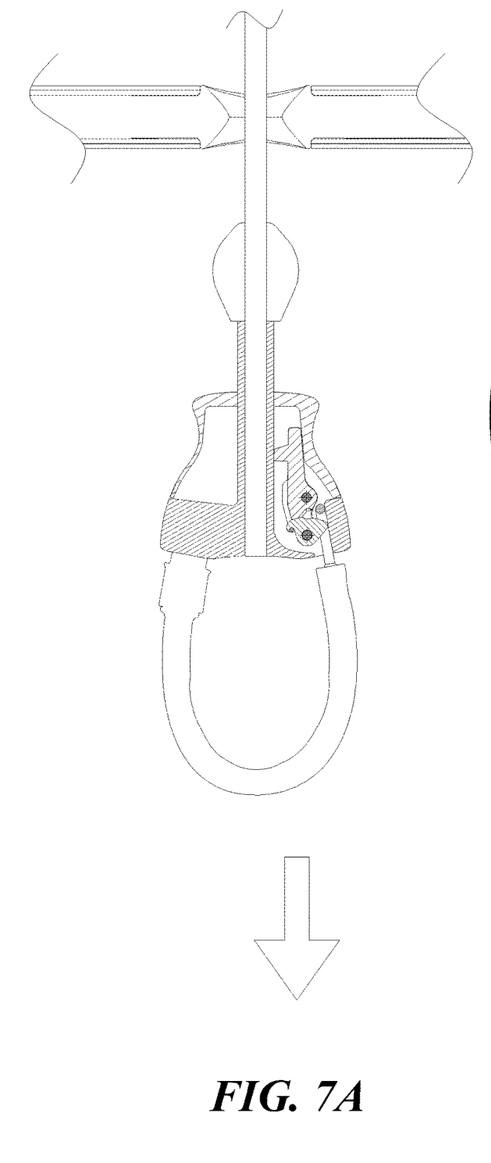
FIG. 7A shows a catch of a chicken loop which has been inserted past a latch, and is latched to the base of an anchor device.
Figure 7B:
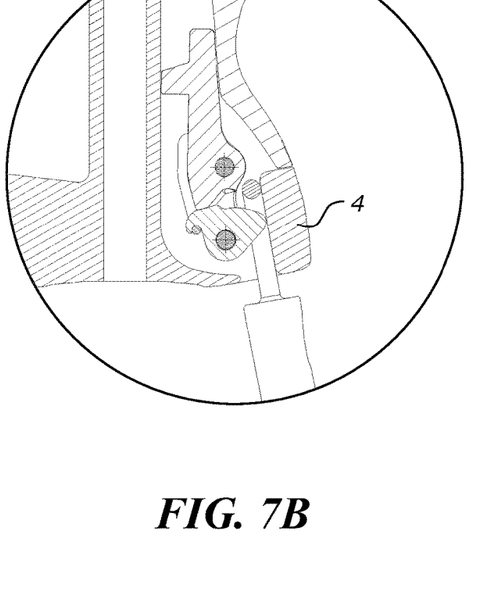
FIG. 7B shows a partial close-up view of the mechanism of FIG. 7A.

A reloading of the catch with the base 4 is shown with reference to FIGS. 6A and 6B. The latch 30 is preferably rotationally mounted to the trip arm 16. It is preferably mounted for rotation about the rotational axis 40 relative to the trip arm. This allows for the latch to move to a loading condition as seen in FIGS. 6A and 6B. In the loading condition the latch is moved (preferably by the catch as it is being reloaded) to a position allowing for the catch to move past the latch and subsequent thereafter to assume a latched condition as seen in FIGS. 7A and 7B. In the preferred form the reloading of the catch occurs when the trip arm 16 is in its first position and the release member is in its retaining position. This means that the release member does not need to be held up to keep the trip arm 16 in its second position for the reloading of the catch. The pivotal mounting of the latch relative to the trip arm 16 allows for a reloading of the catch to occur without having to hold the release member in its released position. A user can cause the chicken loop to release by moving the release member from its retaining position to its release position thereafter the release member may return back to its retaining position and thereafter a user may reload the catch with the latch by inserting the catch for example through an aperture 41 of the base 4 to make contact with the latch causing a latch to move from its latching condition to a loading condition as seen in FIG. 4B thereafter allowing for the latch to move back to its latching condition as seen in FIGS. 7A and 7B thereby retaining the catch with a latch and the base 4. In the preferred form the latch is rotationally stopped from movement about its rotational axis 40 in a clockwise direction away from its latching condition as seen in FIG. 2B. A material interference may exist to prevent such rotation between the latch and the trip arm. A bias such as may be provided by a spring or elastic band 65 may be provided to the latch so as to encourage the latch to move back to its latching condition after it has been moved to its loading condition by for example the catch. The elastic band 65 biases the latch for rotation in a clockwise direction seen in the drawings. It does allow for a rotation of the latch in an anti-clockwise direction to move it to its loading condition when necessary. A bias may also be provided to the trip arm 16 to encourage it to move back to its first position from its second position.

The chicken loop is preferably secured to the base 4 at its first distal end in a more secure and non-quick release manner. It is not necessary for this end to also be in a quick release format because as soon as one end of the chicken loop is released from the base, under the pressure of the kite lines, the chicken loop will release itself from the harness of the user.

Figure 4A:
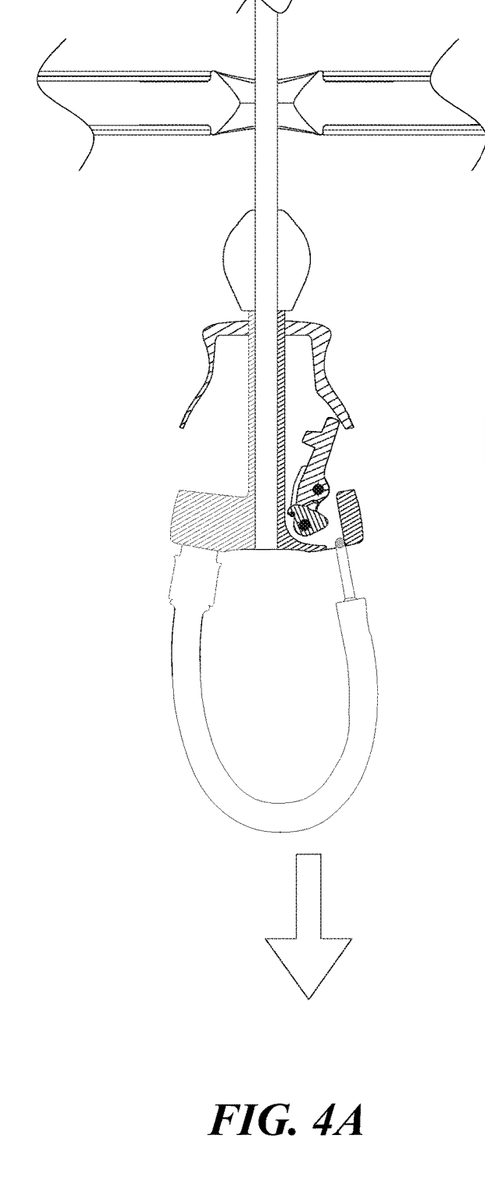
FIG. 4A shows the configuration of FIG. 3A where the catch of a chicken loop is further retracted past a latch of the base.
Figure 4B:
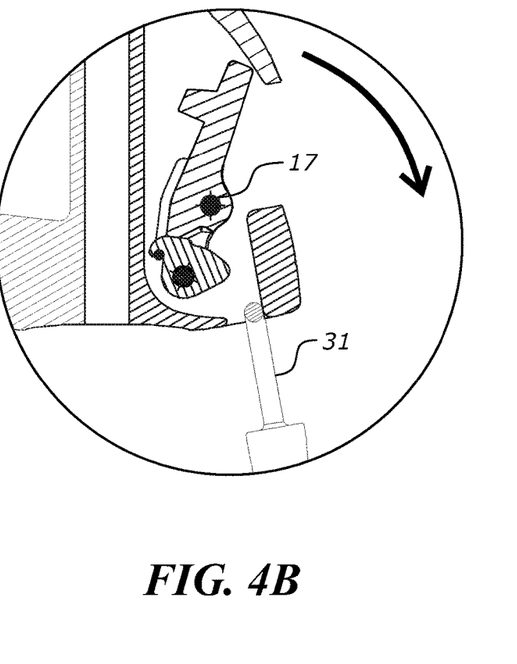
FIG. 4B shows a partial close-up view of the mechanism of FIG. 4A.

Shown in FIGS. 4A and 4B is the latch in its unlatching condition having been rotated about the axis 17 of the trip arm. It may be the load of the catch acting on the latch that causes the rotation of the trip arm to its second position and hence the latch to its unlatching condition. Alternatively there may be an interface between the release member and the trip arm so as to cam the trip arm with the release member for movement between its first and second positions.

It will be appreciated that appropriate positioning of the pivot axes 17 and 40 will help provide appropriate geometry for the mechanism of the invention to operate. The distance between the pivot 17 and the end region 20 of the trip arm and the substantially parallel surfaces of the trip arm and the release member when sliding relative to each other for release ensures that not a significant amount of force is required to overcome friction between the trip arm 17 and the release member 10 to help move the release member to its release position.

The shape of the interfacing surfaces of the latch and the catch may also be such that when the release member has moved to its release position, be forced in the direction of the arrow A applied by the catch to the latch can cause the latch to its unlatching position and cause the trip arm to move from its first position to the second position. A slightly sloping surface as can be seen in FIG. 2B may be provided to facilitate such movement.

The trip arm at its first distal end region rotates from its first position to its second position, away from the shank of the base.

Figure 8:
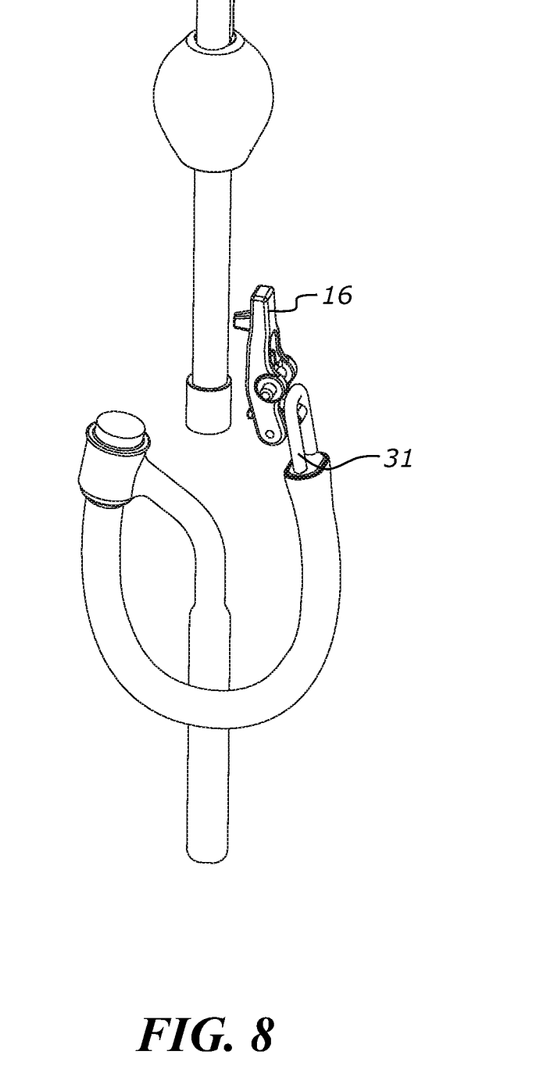
FIG. 8 shows a partial view of an anchor device and chicken loop, with the base and release member hidden.

The catch is preferably of a U-shaped configuration as seen in FIG. 8.

Figures 9A, 9B:
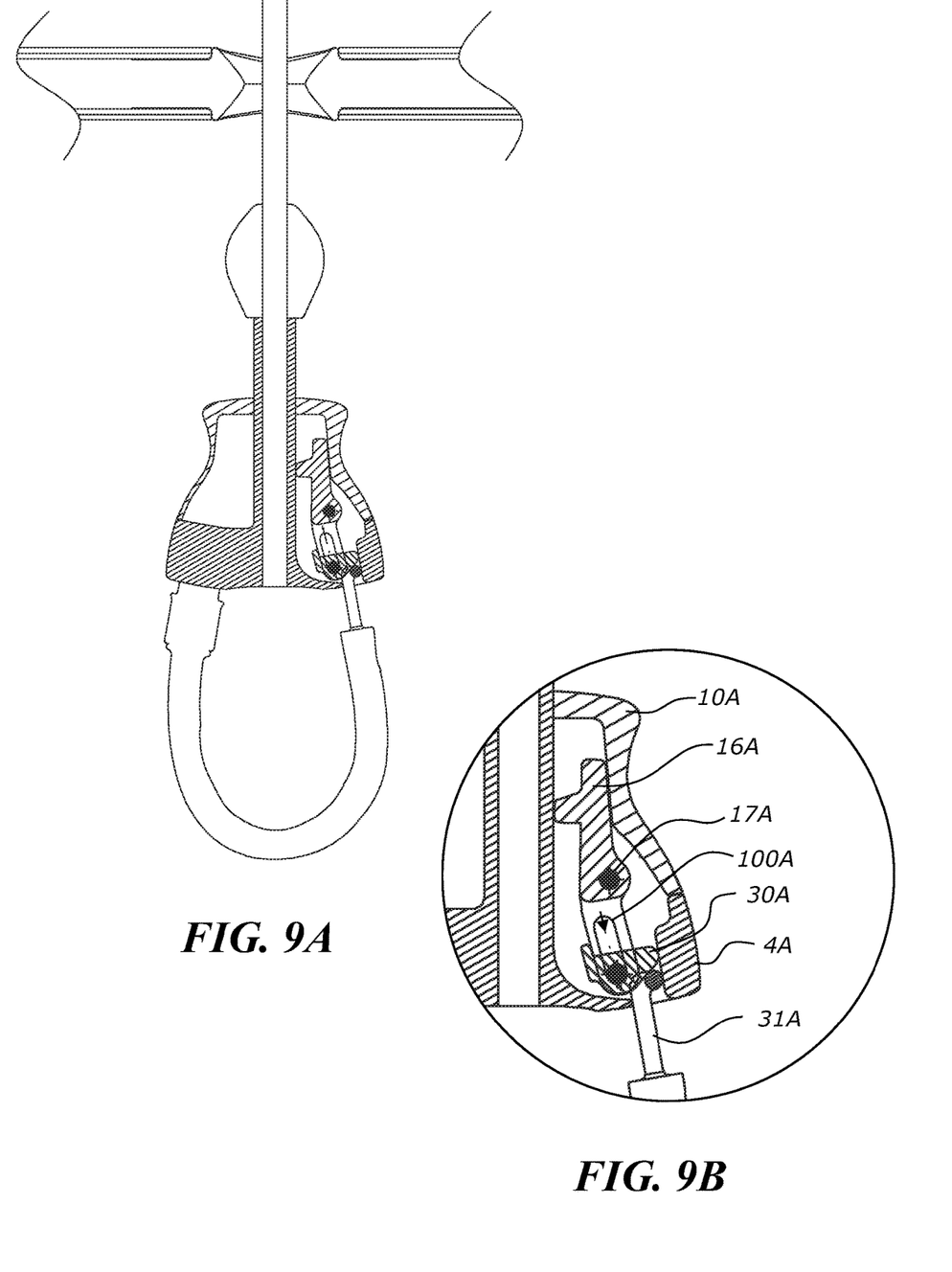
Figures 10A, 10B:
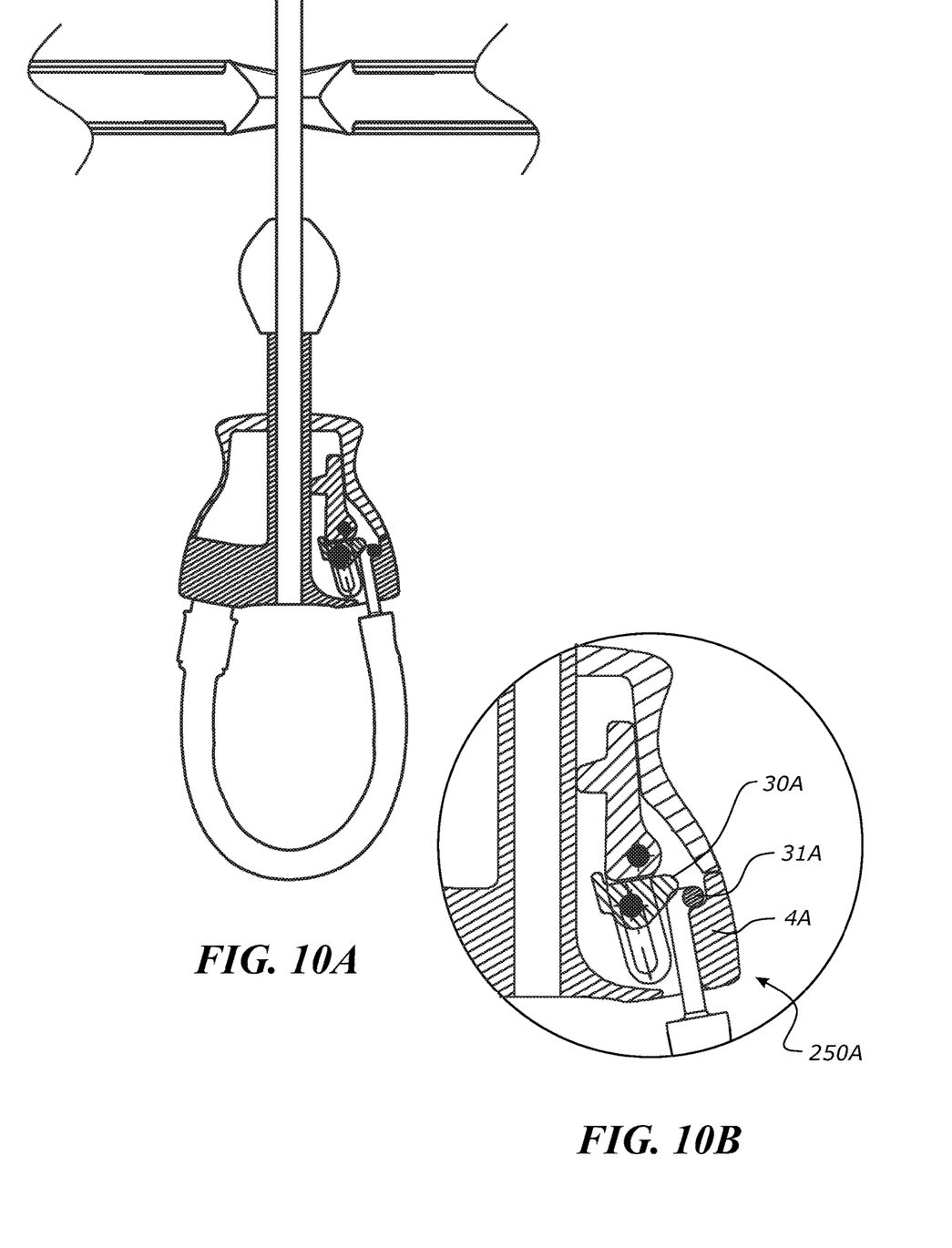
Figure 11A:
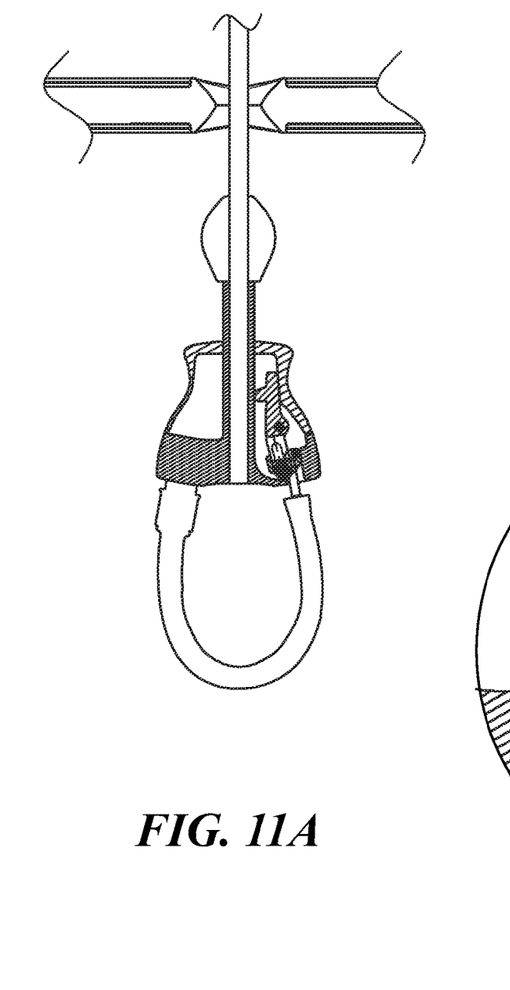
Figure 11B:
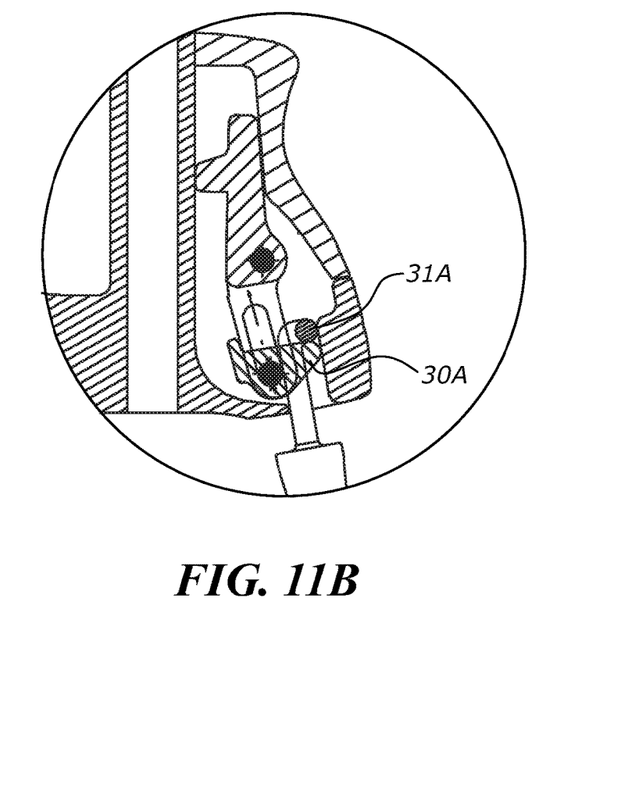

A variation is shown with reference to FIGS. 9 through to 11. In the earlier form herein described the latch is mounted for rotation relative to the trip arm between its latching condition and its loading condition. In FIGS. 9 through to 11 the latch is mounted for translation movement relative to the trip arm between its latching condition and loading condition. As seen in FIGS. 9A and 9B a catch 31A is shown being moved for loading with the latch 30A. The latch 30A is mounted in a slot 100A of the trip arm 16A. The trip arm 16A is still able to move between its first position and second position and likewise the release member 10A is able to move between its retaining position and its released position. The trip arm rotates about its axis 17A relative to the base on 4A. When loading a catch with the latch, the latch 30A is able to move from its retaining position as seen in FIG. 9B to its loading condition as seen in FIG. 10B. The shape and configuration of both the latch 30A and the base 4A at the retaining region 250A of the base 4A is such as to allow for the catch 31A to move past the latch 30A when the latch is moved to its loading condition. The latch 30A is subsequent to the loading condition and the pin having been moved past the latch able to drop back to its retaining position as seen in FIGS. 11A and 11B and for the catch 31A to then be retained by the latch 30A as seen in FIGS. 11A and 11B. Quick release of the catch is again achieved by the rotation of the trip arm from its first position to its second position causing the latch to move from its latching condition to its unlatching condition thereby releasing the catch from the base.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention.

The invention claimed is:

1. A traction kite anchor device to transfer force from a traction kite to a user by attachment of the kite via quick release from a chicken loop to a harness worn by the user, the traction kite anchor device comprising:
   a base provided at an end of at least one line connected directly or indirectly to, or for connection with, a said kite,
   a release member able to move relative to the base between a first position, which is a retaining position, and a second position, which is a release position, by a hand of the user of the kite,
   a trip arm pivotally connected to the base to move between a first rotational position relative to the base and a second rotational position relative to the base, the trip arm having a first end at one side of said pivotal connection thereat to be retained in said trip arm's first position by and when the release member is in said release member's retaining position and wherein the trip arm is able to move from said trip arm's first position to said trip arm's second position when the release member is in said release member's release position,
   a latch mounted at a location differing from the first end of said trip arm to move between a latching condition and an unlatching condition with the trip arm when the trip arm moves between said trip arm's first and second positions,
   a catch of a chicken loop able to be maneuvered relative to the latch to become latched with the latch and be retained by the latch to the base when the trip arm is in the first position and the release member is in said release member's retaining position and the catch is able to be unlatched from the latch and a base member when the latch moves with the trip arm to the trip arm's second position when the release member is caused to move by the user to said release member's release position, wherein
   the latch is able to rotate relative the trip arm between a loading condition and said latch's latching condition when the trip arm is in said trip arm's first position.

2. The traction kite anchor device as claimed in claim 1, wherein the trip arm is confined for movement from said trip arm's first position when the release member is in said release member's retaining position by the base member and the release member.

3. The traction kite anchor device as claimed in claim 1, wherein the latch in said latch's latching condition can secure with the catch and prevent the catch from releasing from the latch until the release member is moved to said release member's release position to allow the trip arm to move to said trip arm's second position to move the latch into said latch's unlatching condition to unlatch the catch from the latch and wherein the latch is able to, independent of the position of the release member, be moved relative to the catch during catch latching to allow the passage of the catch to latched condition.

4. The traction kite anchor device as claimed in claim 1, wherein the trip arm is retained in said trip arm's first position by contact with the release member at a first end of said trip arm.

5. The traction kite anchor device as claimed in claim 1, wherein the trip arm is retained in said trip arm's first position by contact with the release member and base at a first end of said trip arm.

6. The traction kite anchor device as claimed in claim 1, wherein the trip arm is confined for movement from the first position by the release member, when the release member is in the retaining position.

7. The traction kite anchor device as claimed in claim 1, wherein the trip arm can pivot the latch about the pivotal connection from the latching condition to an unlatching condition of the latch when the trip arm moves from said trip arm's first position to said trip arm's second position.

8. The traction kite anchor device as claimed in claim 1, wherein the trip arm is pivotably associated with the base the base having a centerline that is parallel the direction of force applied by the kite lines connected to the base and wherein the first end of the trip arm is positioned more proximal the centerline in said trip arm's first position and is more distal the centerline when in said trip arm's second position.

9. The traction kite anchor device as claimed in claim 1, wherein the trip arm only moves pivotably between said trip arm's first and second positions.

10. The traction kite anchor device as claimed in claim 1, wherein the movement of the latch from the latching condition as a result of the movement of the trip arm from said trip arm's first position to said trip arm's second position comprises either or both of a) a translation of the latch relative the trip arm and b) a pivoting of the latch relative the trip arm as the trip arm pivots relative to the base.

11. The traction kite anchor device as claimed in claim 1, wherein the base and the latch cooperate, when the latch is in said latch's latching condition and the trip arm is in said trip arm's first position, to ensure the catch remains in said catch's latched condition.

12. The traction kite anchor device as claimed in claim 1, wherein in the loading condition the catch is able to move to a position relative to the latch to subsequently become latched therewith.

13. A traction kite anchor device to transfer force from a traction kite to a user by attachment of the kite via quick release from a chicken loop to a harness worn by the user, the traction kite anchor device comprising:
 a base provided at an end of at least one line connected directly or indirectly to, or for connection with, a said kite,
 a release member able to move relative to the base between a first position, which is a retaining position, and a second position, which is a release position, by a hand of the user of the kite,
 a trip arm pivotally connected to the base to move between a first rotational position relative to the base and a second rotational position relative to the base, the trip arm having a first end at one side of said pivotal connection thereat to be retained in said trip arm's first position by and when the release member is in said release member's retaining position and wherein the trip arm is able to move from said trip arm's first position to said trip arm's second position when the release member is in said release member's release position,
 a latch mounted at a location differing from the first end of said trip arm to move between a latching condition and an unlatching condition with the trip arm when the trip arm moves between said trip arm's first and second positions,
 a catch of a chicken loop able to be maneuvered relative to the latch to become latched with the latch and be retained by the latch to the base when the trip arm is in the first position and the release member is in said release member's retaining position and the catch is able to be unlatched from the latch and a base member when the latch moves with the trip arm to the trip arm's second position when the release member is caused to move by the user to said release member's release position,
wherein the movement of the latch from the latching condition as a result of the movement of the trip arm from said trip arm's first position to said trip arm's second position comprises either or both of a) a translation of the latch relative the trip arm and b) a pivoting of the latch relative the trip arm as the trip arm rotates relative to the base.

14. The traction kite anchor device as claimed in claim 1, wherein the trip arm is biased away from said trip arm's first position and towards said trip arm's second position.

15. The traction kite anchor device as claimed in claim 1, wherein movement of the release member to said release member's release position allows the trip arm to move, under the influence of a bias, from the first position to the second position.

16. The traction kite anchor device as claimed in claim 1, wherein the trip arm is associated with the release member, such that a movement of the release member from the retaining position to the release position causes a movement of the trip arm from said trip arm's first position to said trip arm's second position.

17. The traction kite anchor device as claimed in claim 1, wherein the movement of the release member from the retaining position to the release position allows the movement of the trip arm, against a bias, to said trip arm's second position by force applied by the chicken loop to the latch, when the catch is in the latched condition.

18. The traction kite anchor device as claimed in claim 1, wherein at or after reaching the second position and release of the catch from the latch, trip arm can return under a bias to the first position.

19. A traction kite anchor device to transfer force from a traction kite to a user by attachment of the kite via quick release from a chicken loop to a harness worn by the user, the traction kite anchor device comprising:
 a base provided at an end of at least one line connected directly or indirectly to, or for connection with, a said kite,
 a release member able to move relative to the base between a first position, which is a retaining position, and a second position, which is a release position, by a hand of the user of the kite,
 a trip arm pivotally connected to the base to move between a first rotational position relative to the base and a second rotational position relative to the base, the trip arm having a first end at one side of said pivotal connection thereat to be retained in said trip arm's first position by and when the release member is in said release member's retaining position and wherein the trip arm is able to move from said trip arm's first position to said trip arm's second position when the release member is in said release member's release position,
 a latch mounted at a location differing from the first end of said trip arm to move between a latching condition and an unlatching condition with the trip arm when the trip arm moves between said trip arm's first and second positions,
 a catch of a chicken loop able to be maneuvered relative to the latch to become latched with the latch and be retained by the latch to the base when the trip arm is in the first position and the release member is in said release member's retaining position and the catch is able to be unlatched from the latch and a base member when the latch moves with the trip arm to the trip arm's second position when the release member is caused to move by the user to said release member's release position,
wherein the latch is pivotably carried by the trip arm, such that it is able to pivot relative the trip arm in a first direction from the latching condition to a loading condition at which the catch may pass by the latch to become latched with the latch, when the trip arm is in said trip arm's first position.

20. The traction kite anchor device as claimed in claim 1, wherein the latch is pivotably carried by the trip arm.

21. The traction kite anchor device as claimed in claim 1, wherein the latch is pivotably carried by the trip arm, such that it is able to pivot relative the trip arm in a first direction from the latching condition to a loading condition at which the catch may pass by the latch back and in a second direction from the loading condition to the latching condition for the latch to hold the loaded catch in the latched condition.

* * * * *